Sept. 12, 1939.  W. H. BULPITT  2,172,495
ELECTRIC IMMERSION HEATER
Filed Sept. 12, 1938   2 Sheets-Sheet 1

Walter Henry Bulpitt.
Inventor

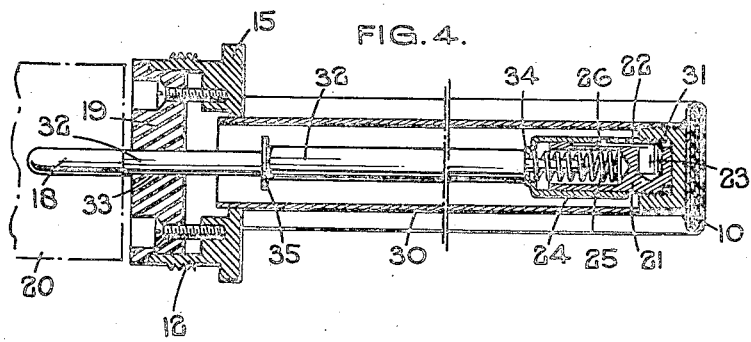
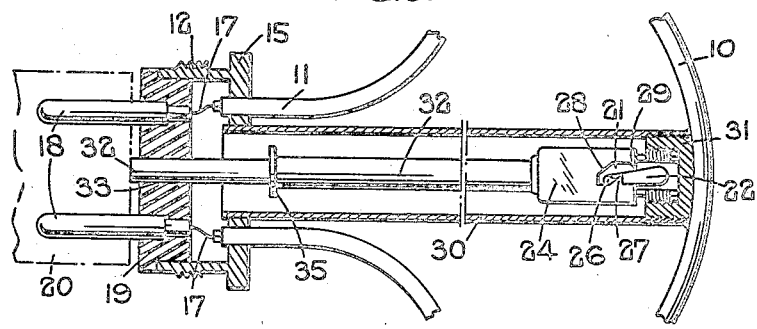
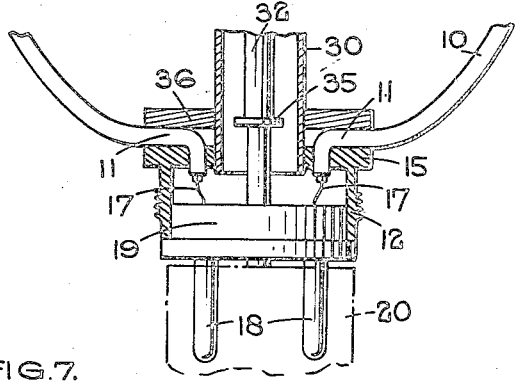
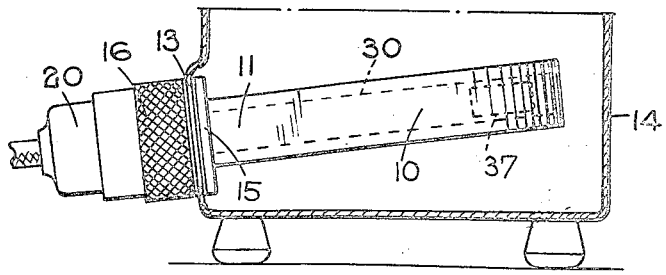

Patented Sept. 12, 1939

2,172,495

UNITED STATES PATENT OFFICE 2,172,495

ELECTRIC IMMERSION HEATER

Walter Henry Bulpitt, Birmingham, England

Application September 12, 1938, Serial No. 229,623
In Great Britain December 3, 1936

8 Claims. (Cl. 219—38)

This invention relates to electric immersion heaters of the kind comprising a tubular metal casing of loop form, this looped casing enclosing a resistance winding and having its ends mounted in a plug which is adapted to be secured in an opening in the wall of a vessel containing the liquid to be heated.

In connection with immersion heaters, it is a common practice to provide a safety device whereby the current is automatically cut off when a certain temperature is reached. The object of this is to ensure that neither the heater nor the vessel itself will be damaged in the event of the heater being forgotten or neglected until all the liquid in the kettle or other vessel has been evaporated.

The object of the present invention is to effect certain improvements in heaters of the kind referred to.

Referring to the drawings—

Figures 4 and 5 are respectively a part-sectional side elevation and plan view of the heater to an enlarged scale.

Figure 6 is a view corresponding to part of Figure 5 but showing a modified construction.

Figure 7 is a view corresponding to Figure 1 showing a further modification.

Figure 1:
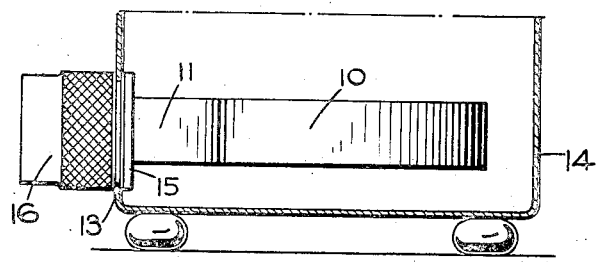
Figure 1 is a part-sectional side elevation of a vessel provided with an immersion heater in accordance with the present invention.
Figure 2:
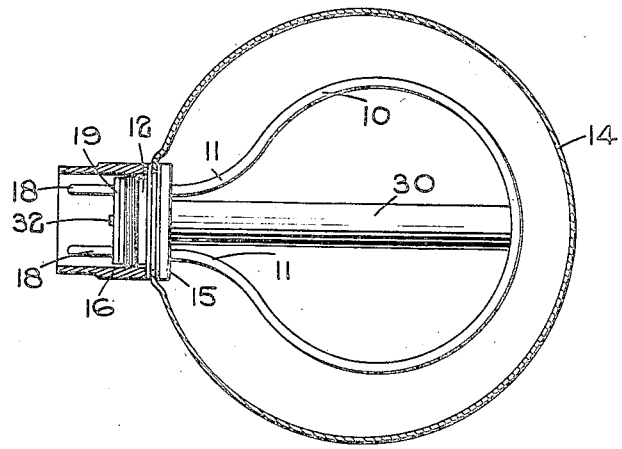
Figure 2 is a part-sectional plan view of same.
Figure 3:
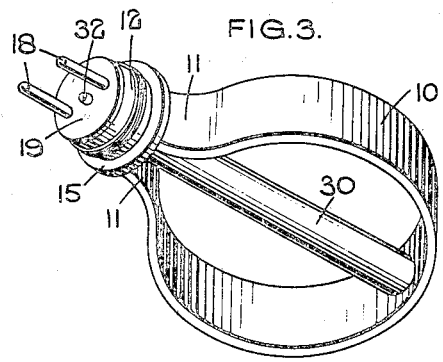
Figure 3 is a perspective view of the heater.

In the construction illustrated, the immersion heater includes a resistance wire 17 which is wound upon a mica strip or other suitable support, the latter being then inserted into a flat section seamless tubular casing 10. This casing is subsequently bent into loop form and has a flat section whose major dimension is perpendicular to the plane of the loop.

It will be seen that the loop aforesaid is of incomplete circular shape, the terminal portions 11 of the casing 10 being turned outwardly into substantially parallel relationship and secured to the inner end of a hollow metal plug 12.

This plug 12 is adapted for insertion in an opening 13 in the wall of a kettle or other vessel 14, and is provided with a shoulder 15 which abuts the inner face of such wall. The body of the plug 12 may be screw threaded to receive a nut 16 which engages the outside of the vessel 14.

The ends of the resistance winding 17 are connected, directly or otherwise, to terminal pins 18 carried by an insulating block 19 in the outer end of the plug 12. The plug 12 forms one part of a coupling, the movable part of which is indicated at 20 and carries sockets for engagement with the pins 19 in known manner.

The safety device associated with the heater is conveniently constructed as described in Letters Patent No. 1,887,082, issued to me on November 8, 1932, in which case it comprises a stationary square section pin 21 and a catch member 22 accommodated in a groove in said pin, a depending lug 23 at one end of the member 22 being journalled in a diametral hole in the pin 21 and normally held against rotation by means of fusible metal, such as solder. A thin metal sleeve 24 fits over the pin 21, and a compression spring 25 is mounted between the two members, the sleeve 24 being held in position by the engagement of a catch 26 on the member 22 with a projection 27 on one side of a slot 28 in the sleeve 24.

When a predetermined temperature is reached, the fusible metal melts and leaves the member 22 free to rotate, so that the sleeve 24 can slide along the pin 21 under the action of the spring 25, the projection 27 slipping past the catch 26. This movement of the sleeve 24 is made use of to force the movable part 20 of the coupling off the terminal pins 18 and so break the circuit.

At the end of its movement the sleeve 24 returns the member 22 to its original position by engagement of a second projection 29 in the slot 28 with the catch 26, the safety device being reset after the fusible metal has solidified by pushing back the sleeve 24 against the spring 25.

The safety device is mounted upon, and in direct metallic connection with, the exterior of the tubular casing 10 of the heater at a position remote from the plug 12.

The above arrangement ensures that the operation of the safety device is not affected by the coating of lime and other deposit which the looped casing inevitably acquires after prolonged use of the heater in hard water. It is a serious disadvantage of certain prior constructions of immersion heater of the kind to which the present invention relates, that the safety device is located in or adjacent the contact-carrying plug, because this deposit is always particularly heavy where the two ends of the looped casing are close together. If the level of the water in the vessel is allowed to sink below the lowest part of the heater, these closely-spaced parts of the casing (and hence the safety device) tend to remain cooler than the rest of the heater owing to the moisture which the deposit thereon has absorbed, and it has frequently been found with the prior constructions in question, that the safety device operates too late to save the resistance winding of the heater from being burned out.

To protect it from the liquid within the vessel 14, the safety device may be enclosed within a tube 30 which extends diametrically across the loop of the heater casing 10, the end of this tube being soldered or otherwise secured to the casing 10 and plug 12 respectively. With a safety device of the kind illustrated, the outer end of the tube 30 may contain a hollow plug 31 into which the pin 21 of the safety device is screwed and which is itself soldered to the inner wall of the casing 10.

The sleeve 24 or other movable part of the safety device acts upon a push-rod 32 which extends axially through the tube 30 and whose free end is slidably supported in a central hole 33 in the insulating block 19 carried by the bush 12. When the movable part 20 of the coupling is in position on the terminal pins 18, its face abuts the end of the push-rod 32. Endwise movement of the latter thus causes the parts of the coupling to be separated, so that the circuit is broken.

The push-rod 32 may be soldered to the sleeve 24 at 34, and it may be provided with a collar 35 which acts as a stop to limit its movement with the sleeve 24.

As already mentioned the deposit upon the immersion heater is found to be greatest when the two ends 11 of the casing 10 are attached to the bush 12, the space between the ends 11 tending to become choked with deposit so that as a consequence this part of the heater becomes inefficient.

With the object of overcoming this difficulty, the terminal portions 11 of the heater casing 10, instead of being bent into substantially parallel relationship, may be brought into alignment as shown in Figure 6 and inserted between a clamping plate 36 and the flange 15 of the bush 12, so that the loop form of the heater casing 10 becomes practically circular and does not provide any very restricted space to be choked with deposit.

The arrangement of the heater casing may be such as to ensure that, when the level of liquid in the vessel 14 sinks, the part of the heater at which the safety device is located will become uncovered (and thus subject to overheating) before the rest of the heater.

In the construction shown in Figure 7, the desired effect is obtained by mounting the looped casing 10 in the vessel 14 with the plane of the loop somewhat inclined to the horizontal, the central portion of the casing being at a higher level than its ends. The safety device is connected to the central portion aforesaid and thus operates, when overheating occurs, in sufficient time to prevent damage to the resistance winding of the heater.

What I claim then is:

1. In combination, a vessel for holding liquid, an electric heater mounted within said vessel and adapted for immersion in said liquid, said heater comprising a tubular metal casing enclosing a resistance winding and bent into loop form, said loop being disposed transverse to said vessel and spaced above the base thereof, a plug adapted to be secured in an opening in the wall of said vessel and having the ends of said looped casing secured therein, a spring-loaded member effective when released to cut off the current through said heater, and heat-responsive means adapted to hold said spring-loaded member in a retracted position against the action of said spring and automatically to release said spring-loaded member on attainment of a predetermined temperature, said heat-responsive means being mounted exteriorly of said looped casing and in direct metallic connection with the same at a position remote from the ends thereof.

2. In combination, a vessel for holding liquid, an electric heater mounted within said vessel and adapted for immersion in said liquid, said heater comprising a tubular metal casing enclosing a resistance winding and bent into loop form, said loop being disposed transverse to said vessel and spaced above the base thereof, a plug adapted to be secured in an opening in the wall of said vessel and having the ends of said looped casing secured therein, contact members carried by said plug and connected to the ends of said resistance winding, said plug constituting one of the two parts of an electrical coupling through which current is taken to said heater, a spring-loaded member effective when released to separate the parts of said coupling, and heat-responsive means adapted to hold said spring-loaded member in a retracted position against the action of said spring and automatically to release said spring-loaded member on attainment of a predetermined temperature, said heat-responsive means being mounted exteriorly of said looped casing and in direct metallic connection with the same at a position remote from the ends thereof.

3. In combination, a vessel for holding liquid, an electric heater mounted within said vessel and adapted for immersion in said liquid, said heater comprising a tubular metal casing enclosing a resistance winding and bent into loop form, said loop being disposed transverse to said vessel and spaced above the base thereof, a plug adapted to be secured in an opening in the wall of said vessel and having the ends of said looped casing secured therein, contact members carried by said plug and connected to the ends of said resistance winding, said plug constituting one of the two parts of an electrical coupling through which current is taken to said heater, a spring-loaded plunger extending through said plug and adapted to engage the other of said coupling members, and heat-responsive means adapted to hold said spring-loaded plunger in a retracted position allowing connection together of said coupling members, said heat-responsive means being mounted in direct metallic connection with the exterior of said looped casing at a position remote from the ends thereof and being adapted on attainment of a predetermined temperature automatically to release said plunger, whereupon the latter operates to separate said coupling members.

4. In combination, a vessel for holding liquid, an electric heater mounted within said vessel and adapted for immersion in said liquid, said heater comprising a tubular metal casing enclosing a resistance winding and bent into the shape of a substantially circular loop disposed transversely of said vessel in proximity to the base thereof, a plug adapted to be secured in an opening in the wall of said vessel, the ends of said looped casing extending side by side in closely spaced relationship and being secured in said plug, a spring-loaded member effective when released to cut off the current through said heater and heat-responsive means adapted to hold said spring-loaded member in a retracted position against the action of said spring and automatically to release said spring-loaded member on attainment of a predetermined temperature, said heat-responsive means being mounted upon and in direct metallic connection with said casing at a position on the inside of said loop substantially opposite to said plug.

5. In combination, a vessel for holding liquid, an electric heater mounted within said vessel and adapted for immersion in said liquid, said heater comprising a tubular metal casing enclosing a resistance element and bent into loop form, said loop being disposed in a plane transverse to said vessel and tilted with reference to the surface of liquid in said vessel when the latter is in its normal position, a plug adapted to be secured in an opening in the wall of said vessel and having the ends of said looped casing secured therein, said casing ends being spaced above the base of said vessel and disposed at a lower level than the central portion of said casing, a spring-loaded member effective when released to cut off the current through said heater, and heat-responsive means adapted to hold said spring-loaded member in a retracted position against the action of said spring and automatically to release said spring-loaded member on attainment of a predetermined temperature, said heat-responsive means being mounted upon and in direct metallic connection with the central portion of said casing.

6. In combination, a vessel for holding liquid, an electric heater mounted within said vessel and adapted for immersion in said liquid, said heater comprising a tubular metal casing enclosing a resistance winding and bent into loop form, said loop being disposed transverse to said vessel and spaced above the base thereof, a plug adapted to be secured in an opening in the wall of said vessel and having the ends of said looped casing secured therein, contact members carried by said plug and connected to the ends of said resistance winding, said plug constituting one of the two parts of an electrical coupling through which current is taken to said heater, a spring-loaded plunger extending through said plug and adapted to engage the other of said coupling members, heat-responsive means adapted to hold said spring-loaded plunger in a retracted position allowing connection together of said coupling members, said heat-responsive means being mounted in direct metallic connection with said casing at a position on the inside of said loop substantially opposite to said plug and being adapted on attainment of a predetermined temperature automatically to release said plunger, whereupon the latter operates to separate said coupling members, and a hollow member extending across said loop from said plug so as to enclose said plunger and heat-responsive means in a fluid-tight manner.

7. In combination, a vessel for holding liquid, an electric heater mounted within said vessel and adapted for immersion in said liquid, said heater comprising a tubular metal casing enclosing a resistance winding and bent into the shape of a substantially circular loop disposed transversely of said vessel in proximity to the base thereof, a plug adapted to be secured in an opening in the wall of said vessel, the ends of said looped casing extending side by side in closely spaced relationship and being secured in said plug, contact members carried by said plug and connected to the ends of said resistance winding, said plug constituting one of the two parts of an electrical coupling through which current is taken to said heater, a spring-loaded plunger extending through said plug and adapted to engage the other of said coupling members, heat-responsive means adapted to hold said spring-loaded plunger in a retracted position allowing connection together of said coupling members, said heat-responsive means being mounted in direct metallic connection with said casing at a position on the inside of said loop substantially opposite to said plug and being adapted on attainment of a predetermined temperature automatically to release said plunger, whereupon the latter operates to separate said coupling members, and a tube extending across said loop from said plug and passing between the ends of said casing, said tube enclosing said plunger and heat-responsive means in a fluid-tight manner.

8. In combination, a vessel for holding liquid, an electric heater mounted within said vessel and adapted for immersion in said liquid, said heater comprising a tubular metal casing enclosing a resistance winding and bent into the shape of a substantially circular loop disposed transversely of said vessel in proximity to the base thereof, a plug adapted to be secured in an opening in the wall of said vessel, the ends of said looped casing being aligned with one another in closely-spaced relationship, a plate clamping said casing ends to the inner face of said plug, contact members carried by said plug and connected to the ends of said resistance winding, said plug constituting one of the two parts of an electrical coupling through which current is taken to said heater, a spring-loaded plunger extending through said clamping plate and said plug and adapted to engage the other of said coupling members, and heat-responsive means adapted to hold said spring-loaded plunger in a retracted position allowing connection together of said coupling members, said heat-responsive means being mounted in direct metallic connection with the exterior of said looped casing at a position remote from the ends thereof and being adapted on attainment of a predetermined temperature automatically to release said plunger, whereupon the latter operates to separate said coupling members.

WALTER H. BULPITT.